US005922782A

United States Patent [19]
Khemani

[11] Patent Number: 5,922,782
[45] Date of Patent: *Jul. 13, 1999

[54] FOAMABLE COPOLYESTERS PREPARED FROM DIVALENT METAL CONTAINING CO-IONOMERS

[75] Inventor: Kishan Chand Khemani, Johnson City, Tenn.

[73] Assignee: Eastman Chemical Company, Kingsport, Tenn.

[21] Appl. No.: 09/118,165

[22] Filed: Jul. 16, 1998

Related U.S. Application Data

[60] Provisional application No. 60/053,634, Jul. 23, 1997.

[51] Int. Cl.$^6$ ........................................................ C08J 9/00
[52] U.S. Cl. ............................................... 521/182; 521/79
[58] Field of Search ....................................... 521/79, 182

[56] References Cited

U.S. PATENT DOCUMENTS

| | | |
|---|---|---|
| 3,018,272 | 1/1962 | Griffing et al. . |
| 3,734,874 | 5/1973 | Kibler et al. . |
| 3,779,993 | 12/1973 | Kibler et al. . |
| 3,853,820 | 12/1974 | Vachon . |
| 4,132,707 | 1/1979 | Borman . |
| 4,145,466 | 3/1979 | Leslie et al. . |
| 4,233,196 | 11/1980 | Sublett . |
| 4,335,220 | 6/1982 | Coney . |
| 4,499,262 | 2/1985 | Fagerburg et al. . |
| 4,579,936 | 4/1986 | O'Neil . |
| 4,999,388 | 3/1991 | Okamoto . |
| 5,000,991 | 3/1991 | Hayashi et al. . |
| 5,053,482 | 10/1991 | Tietz . |
| 5,110,844 | 5/1992 | Hayashi et al. . |
| 5,128,383 | 7/1992 | Amano et al. . |
| 5,134,028 | 7/1992 | Hayashi et al. . |
| 5,399,595 | 3/1995 | Sublett et al. . |

FOREIGN PATENT DOCUMENTS

| | | |
|---|---|---|
| 0 126 890 A2 | 12/1984 | European Pat. Off. . |
| 0 372 846 A2 | 6/1990 | European Pat. Off. . |
| 0 413 418 A2 | 2/1991 | European Pat. Off. . |
| WO 91/18036 A1 | 11/1991 | WIPO . |
| WO 94/21442 A1 | 9/1994 | WIPO . |

OTHER PUBLICATIONS

Chemical Abstracts, vol. 98, No. 10, Mar. 7, 1983, Columbus, Ohio, US; abstract No. 73759, XP002081777, see abstract & JP 57 143323 A (Teijin Ltd.) Sep. 4, 1982.

Munari, A. et al: "Rheological Behavior of Poly (1,4–Butylene Isophthalate) Containing Sodium Sulfonate Groups" Journal of Applied Polymer Science, vol. 50, No. 1, Oct. 5, 1993, pp. 159–164, XP000462192, see abstract.

*Primary Examiner*—Morton Foelak
*Attorney, Agent, or Firm*—Cheryl J. Tubach; Harry J. Gwinnell

[57] ABSTRACT

Disclosed is are high molecular weight copolyester compositions which possess high melt viscosity and melt strength which render them foamable with a wide range of foaming agents. The copolyesters consist essentially of (A) diacid residues comprising (i) from about 99.9 to about 95 mol % of residues of an aromatic dicarboxylic acid having 8 to 12 carbon atoms and (ii) from about 0.1 to about 5.0 mol % of residues of an aromatic dicarboxylic acid sulfonate monomer containing at least one divalent metal sulfonate group attached to an aromatic nucleus, and (B) diol residues comprising residues of at least one aliphatic or cycloaliphatic diol having 2 to 8 carbon atoms, the mol % being based on 100 mol % dicarboxylic acid residues and 100 mol % diol residues.

3 Claims, No Drawings

FOAMABLE COPOLYESTERS PREPARED FROM DIVALENT METAL CONTAINING CO-IONOMERS

REFERENCE TO RELATED APPLICATION

This application claims the benefit of U.S. Provisional Application No. 60/053,634, filed Jul. 23, 1997.

FIELD OF THE INVENTION

This invention relates to high molecular weight copolyester compositions and, more particularly, to such copolyesters compositions possessing high melt viscosity and melt strength which render them foamable with a wide range of foaming agents.

BACKGROUND OF THE INVENTION

Thermoplastic polymeric materials are foamed to provide low density articles such as films, cups, food trays, decorative ribbons, and furniture parts. For example, polystyrene beads containing low boiling hydrocarbons such as pentane are formed into lightweight foamed cups for hot drinks such as coffee, tea, hot chocolate, and the like. Polypropylene can be extruded in the presence of blowing agents such as nitrogen or carbon dioxide gas to provide decorative films and ribbons for package wrappings. Also, polypropylene can be injection molded in the presence of blowing agents to form lightweight furniture parts such as table legs and to form lightweight chairs.

Polyesters such as poly(ethylene terephthalate) typically have a much higher density (e.g. about 1.3 g/cc) than other polymers. Therefore, it would be desirable to be able to foam polyester materials to decrease the weight of molded parts, films, sheets, food trays, and the like. Such foamed articles also have better insulating properties than unfoamed parts. However, it is difficult to foam such polyester materials because of the low melt viscosity and low melt strength of typical poly(ethylene terephthalate) and related polyester polymers. The low melt viscosity and low melt strength of the polyesters is a problem because the polymer melt will not adequately retain the bubbles of an expanding gas. It would be desirable therefore to be able to provide polymers which could be foamed with conventional foaming systems.

One approach to providing polyesters having high melt strengths and melt viscosities involves treating preformed polyesters with multifunctional carboxylic acids or polyols to provide branched polyesters. Such compositions are disclosed in U.S. Pat. Nos. 4,132,707; 4,145,466; 4,999,388; 5,000,991; 5,110,844; 5,128,383; and 5,134,028. The branching agents used include tri- and tetracarboxylic acids and anhydrides such as trimesic acid, pyromellitic acid, and pyromellitic dianhydride or polyols such as trimethylolpropane and pentaerythritol.

Polyesters containing dicarboxylic acid sulfomonomers are disclosed in U.S. Pat. Nos. 3,734,874; 3,779,993; 4,335,220; 4,233,196; 3,853,820; and 5,053,482. U.S. Pat. Nos. 3,734,874 and 4,233,196 are concerned with amorphous water dispersible polyesters which contain at least 8 mole percent of a sulfomonomer and substantial amounts of a difunctional glycol ether component. U.S. Pat. No. 3,853,820 describes an amorphous water dissipatable polyester with at least 20 mole percent of a poly(ethylene glycol) which is a condensation polymer of ethylene glycol. In addition, U.S. Pat. No. 5,053,482 describes fiber- and film-forming polyesters based on polyethylene terephthalate polyesters containing 20 to 40 mole percent of diethylene glycol for use in disposable products such as disposable diapers. U.S. Pat. Nos. 4,499,262; and 4,579,936 pertain to polyester compositions useful for the manufacture of bottles.

U.S. Pat. No. 5,399,595 discloses polyesters which contain small amounts of residues of a dicarboxylic acid sulfonate monomer containing monovalent metal ions, e.g., alkali metals, and foamed articles prepared therefrom. According to the patent, the presence of an alkali metal sulfonate monomer, e.g., residues of 5-sodiosulfoisophthalic acid, in the polyesters provides the copolyester compositions with increased melt viscosities.

SUMMARY OF THE INVENTION

Accordingly, one object of the present invention is to provide crystalline hydrophobic polyesters which possess improved melt strength and melt viscosity which render the polyesters especially useful for extruding, molding or foaming into useful objects.

Another object of the invention is to provide novel copolyesters compositions derived from one or more aromatic dicarboxylic acids, a dicarboxylic acid sulfonate monomer which contains a divalent metal ion, and at least one aliphatic or cycloaliphatic glycol, which are foamable to produce articles exhibiting good physical properties and appearance.

These and other objects are accomplished herein by the present invention which provides a copolyester having an I.V. of about 0.70–1.20 dL/g and a melt strength and melt viscosity sufficiently high to permit foaming during extrusion or molding operations, wherein the copolyester consists essentially of (A) diacid residues comprising (i) from about 99.9 to about 95 mol % of residues of an aromatic dicarboxylic acid having 8 to 12 carbon atoms and (ii) from about 0.1 to about 5.0 mol % of residues of an aromatic dicarboxylic acid sulfonate monomer containing at least one divalent metal sulfonate group attached to an aromatic nucleus, and (B) diol residues comprising residues of at least one aliphatic or cycloaliphatic diol having 2 to 8 carbon atoms, the mol % being based on 100 mol % dicarboxylic acid residues and 100 mol % diol residues.

Also, according to the present invention there is provided a method of increasing the melt viscosity and melt strength of a copolyester used in producing a foamed article, the copolyester consisting essentially of residues of from 100 mol % of a dicarboxylic acid component and residues from a diol component, the method comprising copolymerizing into the copolyester about 0.1 to about 5.0 mol % of a dicarboxylic acid sulfonate monomer containing at least one divalant metal sulfonate group attached to an aromatic nucleus.

DESCRIPTION OF THE INVENTION

A wide range of polyester compositions can be modified with small amounts of a dicarboxylic acid sulfomonomer to provide copolyester compositions with increased melt viscosities and melt strengths which have good foaming characteristics. Polymers suitable for foaming must have a melt viscosity and melt strength which is sufficient to retain the bubbles of an expanding gas during molding or extrusion operations. Good melt viscosity and melt strength is also essential for the manufacture of rigid foams and foamed containers having uniform wall thickness.

The polyesters of the present invention consist essentially of diacid residues comprising terephthalic residues, naphthalenedicarboxylic acid residues, and dicarboxylic acid sulfonate monomer residues and diol residues comprising an aliphatic or cycloaliphatic glycol residues, based on 100 mol % percent diacid residues and 100 mol % diol residues. The term "consisting essentially of" means that in addition to the terephthalic or naphthalenedicarboxylic acid residues, dicarboxylic acid sulfonate monomer residues and glycol component residues, other dicarboxylic acids and diols may be present in the copolyester provided that the basic and essential characteristics of the polyester are not materially affected thereby. For example, the copolyesters of the present invention optionally may be modified with up to about 25 mole percent, based on 100 mole percent diacid residues, of one or more residues derived from dicarboxylic acids different from terephthalic acid or suitable synthetic equivalents, and the dicarboxylic acid sulfonate monomer. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid and the dicarboxylic acid sulfonate monomer are: phthalic acid, isophthalic acid, 1,4-cyclohexanedicarboxylic acid, 1,4-naphthalenedicarboxylic acid, 2,5-naphthalenedicarboxylic acid, 2,6-naphthalenedicarboxylic acid, 2,7-naphthalenedicarboxylic acid, cyclohexanediacetic acid, diphenyl-4,4'-dicarboxylic acid, succinic acid, sebacic acid, suberic acid, adipic acid, glutaric acid, azelaic acid, fumaric acid, maleic acid, itaconic acid, and the like. Polyesters may be prepared from two or more of the above dicarboxylic acids. The diacid residues may be derived from the dicarboxylic acid, or esters or acid chlorides or, in some cases, anhydrides of the dicarboxylic acids.

In addition, the polyesters of the present invention may optionally be modified with up to about 25 mole %, based on 100 mole percent diol, of one or more different diols other than ethylene glycol. Such additional diols include cycloaliphatic diols preferably having 3 to 8 carbon atoms. Examples of such diols to be included with ethylene glycol are: 1,4-cyclohexanedimethanol, diethylene glycol, 1,3-propanediol, 1,3-butanediol, 1,4-butanediol, 1,5-pentanediol, 1,3-hexanediol, 3-methyl-2,4-pentanediol, 2-methyl-1,4-pentanediol, 2,2,4-trimethyl-1,3-pentanediol, 2,2-dimethyl-1,3-propanediol, 2,2-diethyl-1,3-propanediol, 2-ethyl-2-butyl-1,3-propanediol, 2-ethyl-2-isobutyl-1,3-propanediol, 1,6-hexanediol, 2,2,4-trimethyl-1,6-hexanediol, thiodiethanol, 2-ethyl-1,3-hexanediol, 1,4-di-(hydroxyethoxy)-benzene, 2,2-bis(4-hydroxycyclohexyl) propane, 2,2-bis-(3-hydroxyethoxyphenyl)propane, 2,2-bis-(4-hydroxypropoxyphenyl)propane, and the like. Polyesters may be prepared from two or more of the above diols.

The dicarboxylic acid sulfomonomer component of the polyester is derived from a dicarboxylic acid or ester thereof containing a divalent metal sulfonate group. The metal ion of the sulfonate salt may be $Mg^{++}$, $Zn^{++}$, $Ca^{++}$, $Ba^{++}$, $Co^{++}$, and the like. The sulfonate salt group is attached to an aromatic acid nucleus such as a benzene, naphthalene, diphenyl, oxydiphenyl, sulfonyldiphenyl, or methylenediphenyl nucleus. Preferably, the sulfonate monomer is the residue of a sulfonate-substituted phthalic acid, terephthalic acid, isophthalic acid, naphthalene-2,7-dicarboxylic acid. Most preferably, the sulfonate monomer residues are magnesium isophthalic-5-sulfonate acid residues.

The dicarboxylic acid sulfonate monomer residues are present in a critical amount of about 0.1 to about 5 mole % based on the total diacid content. The use of dicarboxylic acid sulfonate monomer residues containing divalent metal ions in the present invention provides foamable copolyester compositions with increased melt viscosity and melt strength. The divalent metal ion serves as an ionic linking agent in these copolyesters for the pendant sulfonate ions on neighboring or adjacent polymeric chains, and thereby provides a "pseudo branching" or "pseudo cross-linking" effect due to the strong ionic bonds. This results in a highly enhanced melt strength and melt viscosity for the resulting copolyesters.

In addition to the presence of the dicarboxylic acid sulfonate monomer, the polyesters of the present invention also must have high molecular weight in order to achieve sufficient melt strength and melt viscosity to be foamed. High molecular weight polyesters for the purpose of this invention are defined as polyesters having an inherent viscosity (I.V.) of greater than 0.70 dL/g. It is important to note that a correlation exists between the I.V. of the polyester and the amount of dicarboxylic acid sulfonate monomer required to provide the polyesters with sufficient melt strength and melt viscosity to be useful for foaming. For example, polyesters having an I.V. of about 0.75 dL/g require about 0.25 to about 0.5 mole % of the sulfonate monomer. Polyesters having an I.V. of about 1.0 dL/g to 1.1 dL/g require only about 0.1 to about 0.2 mole percent of the sulfomonomer to be useful for foaming. Thus, the amount of the dicarboxylic acid sulfomonomer added is generally inversely proportional to the inherent viscosity of the polyester.

To achieve the high molecular weight polyesters which are necessary for the present invention, it is necessary to use a combination of melt phase and solid state polymerization. The combination is used because polymerization in the melt phase to high molecular weight causes thermal degradation of the polymer. In the melt polymerization, the dicarboxylic acids or ester forming derivatives thereof, and one or more diols are heated in the presence of esterification and/or polyesterification catalysts at temperatures in the range of about 150° C. to about 300° C., and pressures of atmospheric to about 0.2 mm Hg. Normally, the dicarboxylic acids or derivatives thereof are esterified or transesterified with the diol(s) at atmospheric pressure and at a temperature at the lower end of the specified range. Polycondensation then is effected by increasing the temperature and lowering the pressure while excess diol is removed from the mixture. The polycondensation reaction is continued until the inherent viscosity of the polymer melt reaches about 0.35 dL/g or greater. At this point, the melt is cooled to produce a solid which is pelletized, chopped, granulated, or powdered.

The pellets or other solid forms are then subjected to a solid state polymerization at 215° C. wherein diol is removed by circulating or blowing an inert gas, such as nitrogen, through the pellets. A polycondensation reaction is thus conducted in the solid state. The solid state polycondensation reaction is continued until the inherent viscosity of the polymer reaches about 0.70 dl/g or greater.

The preferred colpolyesters of the present invention have an inherent viscosity of about 0.7 to 1.2 dL/g and consist essentially of (A) 99.75 to 97.0 mole percent terephthalic acid residues and 0.25 to 3.0 mole percent of isophthalic acid 5-sulfonate residues containing a divalent metal selected from $Mg^{++}$, $Zn^{++}$, $Ca^{++}$, $Ba^{++}$, and $Co^{++}$ and (B) ethylene glycol residues, wherein the mole percentages are based on 100 mole percent diacid residues and 100 moles percent ethylene glycol residues. Copolyesters in which the isophthalic acid 5-sulfonate residues are derived from magnesium isophthalic acid 5-sulfonate are particularly preferred.

The polymer compositions of this invention are readily foamed by a wide variety of methods. These include the injection of an inert gas such as nitrogen or carbon dioxide into the melt during extrusion or molding operations. Alternatively, inert hydrocarbon gases such as methane, ethane, propane, butane, and pentane, or chlorofluorocarbons, hydrochlorofluorocarbons, hydrofluorocarbons, and the like may be used. Another method involves the dry blending of chemical blowing agents with the polyester and then extrusion or molding the compositions to provide foamed articles. During the extrusion or molding operation, an inert gas such as nitrogen is released from the blowing agents and provides the foaming action. Typical blowing agents include azodicarbonamide; hydrazocarbonamide; dinitrosopentamethylenetetramine; p-toluenesulfonyl hydrazodicarboxylate; 5-phenyl-3,6-dihydro-1,3,4-oxa-diazin-2-one; sodium borohydride; sodium bicarbonate; 5-phenyltetrazole, p,p'-oxybis (benzenesulfonylhydrazide); and the like. Still another method involves the blending of sodium carbonate or sodium bicarbonate with one portion of polyester pellets, the blending of an organic acid such as citric acid with another portion of polyester pellets and then a blend of the two types of pellets are extruded or molded at elevated temperatures. Carbon dioxide gas released from the interaction of the sodium carbonate and citric acid provide for the foaming action in the melt.

In many cases, nucleating agents such as talc, $TiO_2$, or small amounts of polyolefin materials such as polyethylene, polypropylene, ethylene, or propylene copolymers and the like are also beneficial additives for the foamable polyester compositions. Certain nucleating agents are important to create sites for bubble initiation and to influence the cell size of the foamed sheet or foamed object.

Patents disclosing various foaming procedures and equipment include U.S. Pat. Nos. 5,116,881; 5,134,028; 4,626,183; 5,128,383; 4,746,478; 5,110,844; 5,000,991; and 4,761,256. Other background information on foaming technology may be found in *Kirk-Othmer Encyclopedia of Chemical Technology*, Third Edition, Volume 11, pp 82–145 (1980), John Wiley and Sons, Inc., New York, N.Y. and the *Encyclopedia of Polymer Science and Engineering*, Second Edition, Volume 2, pp 434–446 (1985), John Wiley and Sons, Inc., New York, N.Y.

Many other ingredients can be added to the compositions of the present invention to enhance the performance properties of the blends. For example, buffers, antioxidants, metal deactivators, colorants, phosphorus stabilizers, impact modifiers, nucleating agents, ultraviolet light and heat stabilizers, and the like, can be included herein. All of these additives and the use thereof are well known in the art and do not require extensive discussions. Therefore, only a limited number will be referred to, it being understood that any of these compounds can be used so long as they do not hinder the present invention from accomplishing its objects.

Desirable additives include impact modifiers and antioxidants. Examples of typical commercially available impact modifiers well-known in the art and useful in this invention include ethylene/propylene terpolymers, styrene based block copolymers, and various acrylic core/shell type impact modifiers. The impact modifiers may be used in conventional amounts of from 0.1 to 25 weight percent of the overall composition and preferably in amounts from 0.1 to 10 weight percent of the composition. Examples of typical commercially available antioxidants useful in this invention include, but are not limited to, hindered phenols, phosphites, diphosphites, polyphosphites, and mixtures thereof. Combinations of aromatic and aliphatic phosphite compounds may also be included.

The materials and testing procedures used for the results shown herein are as follows:

Inherent viscosity (I.V.) is measured at 25° C. using 0.50 grams of polymer per 100 mL of a solvent consisting of 60% by weight phenol and 40% by weight tetrachloroethane.

Melt Strength and Die Swell are determined according to ASTM D3835 by extruding the molten polyester downward through a die 0.1 inch in diameter and 0.25 inches long at a shear rate of 20 second$^{-1}$ using an Instron rheometer and allowing the extrudate to fall freely. Die Swell is determined by measuring the diameter of the extrudate immediately outside the orifice and dividing by the diameter of the orifice. Die Swell is reported as percent Die Swell. The diameter of the end of a six inch length of extrudate, measured from the orifice of the die, is measured. The percent Melt Strength is determined from the formula:

$$\frac{D-0.1}{0.1} \times 100$$

wherein D is the diameter, in inches, of the extrudate supporting a six inch length of extrudate. If D is less than 0.1 inch, the Melt Strength is a negative number since there is no increase in the diameter of the extrudate. If D is greater than 0.1 inch, the Melt Strength is a positive number.

Elongation: ASTM-D638

Flexural Modulus: ASTM-D790

Flexural Strength: ASTM-D790

Heat Deflection Temperature: ASTM-D785

Izod Impact Strength: ASTM-D256

Rockwell Hardness: ASTM-D648

Tensile Strength: ASTM-D638

The mole percentages of the 5-magnesium sulfoisophthalate acid residues of the polyesters are determined by measuring the percent sulfur by X-ray florescence technique. The mole percentages of the diol and acid residues are determined by gas chromatography or NMR.

The copolyesters provided by the present invention and the preparation thereof are further illustrated by the following examples wherein all parts and percentages are by weight unless otherwise stated.

EXAMPLE 1

Magnesium acetate [Mg(OAc)$_2$·4H$_2$O; Aldrich; 383.88 g, 3.58 equivalents) was dissolved in 800 mL of distilled water in a three liter beaker. Four batches of solutions of 5-sodiosulfoisophthalic dimethyl ester (50 g each, 0.169 equivalents) in hot distilled water (200 mL each) also were prepared in separate, one-liter beakers. The beaker containing the magnesium acetate solution was placed on a hot plate and stirred vigorously using a magnetic stirring bar. The four 5-sodiosulfoisophthalic dimethyl ester solutions were slowly added into the above stirred solution one-at-a-time. The resulting white precipitate-containing mixture was heated and stirred continuously until a clear solution was obtained. The stirring and heating were discontinued and the solution allowed to cool to room temperature. The white precipitate was collected on a large Buchner funnel and rinsed with a little cold distilled water (~100 mL). The precipitate the was transferred to a clean three liter beaker and stirred vigorously into 1000 mL of distilled water and filtered using a large Buchner funnel. The precipitate was rinsed with cold water once again (~100 mL). Next, the precipitate was placed with 1400 mL of distilled water in another clean three liter beaker, and heated on a hot plate under stirring until dissolved to give a clear solution. The beaker containing this solution was covered with an aluminum foil and allowed to cool and crystallized over 48 hours. The white crystals formed were collected by filtration on a Buchner funnel and dried under a mild vacuum at room temperature for 2 hours; then at ambient pressure and temperature for 24 hours. Finally it was dried in a vacuum oven at 60° C. for 24 hours at 18 inches of Hg. The dried product was 5-magnesiumsulfoisophthalic dimethyl ester and weighed 190 grams (94.8% yield). The product was fully characterized by analytical techniques such as FTIR, $^1$H-NMR, Karl Fischer titration, DSC, TGA, weight % S, ICP etc.

EXAMPLE 2

A polymer synthesis vessel was charged with 49.75 mole percent dimethyl terephthalate, 100 mole percent ethylene glycol, 0.50 mole percent dimethyl 5-magnesiumsulfoisophthalate and 1 mole percent sodium acetate. To this mixture were added 20 ppm Ti (as titanium tetraisopropoxide), 55 ppm Mn (as manganese acetate tetrahydrate), 80 ppm Co (as cobalt acetate) and 230 ppm Sb (as antimony oxide). The mixture was purged with nitrogen under vigorous agitation, and heated initially to 200° C. After an hour, the temperature was raised to 210° C. Two hours later, 108 ppm P (as Zonyl A) was added and the temperature was raised to 280° C. The nitrogen purge was cut-off at this point and a vacuum was applied to reduce the pressure in the reactor vessel to 0.2 mm of Hg. The temperature was maintained at 280° C. with agitation and the reduced pressure for 40 minutes. Near the end of this period, the agitation becomes very difficult due to the high melt strength and melt viscosity of the resin melt. The melt phase-prepared copolymer thus prepared and had an inherent viscosity of 0.61 dL/g, a melt strength of −68% and a die swell of 2%. The polymer then was solid-stated (8 hours at 215° C.) to an I.V. of 0.90 dL/g by conventional solid stating methods. The solid-stated copolyester had a melt strength of −21% and a die swell of 10%.

The invention has been described in detail with particular reference to preferred embodiments thereof, but it will be understood that variations and modifications can be effected within the spirit and scope of the invention.

I claim:

1. A foamed article comprising a copolyester having an I.V. of about 0.70–1.20 dL/g and a melt strength and melt viscosity sufficiently high to permit foaming during extrusion or molding operations, wherein the copolyester consists essentially of (A) diacid residues comprising (i) from about 99.9 to about 95 mol % of residues of an aromatic dicarboxylic acid having 8 to 12 carbon atoms and (ii) from about 0.1 to about 5.0 mol % of residues of an aromatic dicarboxylic acid sulfonate monomer containing at least one divalent metal sulfonate group attached to an aromatic nucleus, and (B) diol residues comprising residues of at least one aliphatic or cycloaliphatic diol having 2 to 8 carbon atoms, the molt being based on 100 mol % dicarboxylic acid residues and 100 mol % diol residues.

2. A foamed article comprising a colpolyester having an inherent viscosity of about 0.7 to 1.2 dL/g and consist essentially of (A) 99.75 to 97.0 mole percent terephthalic acid residues and 0.25 to 3.0 mole percent of isophthalic acid 5-sulfonate residues containing a divalent metal selected from $Mg^{++}$, $Zn^{++}$, $Ca^{++}$, $Ba^{++}$, and $Co^{++}$ and (B) ethylene glycol residues, wherein the mole percentages are based on 100 mole percent diacid residues and 100 moles percent ethylene glycol residues.

3. A foamed article according to claim 2 wherein the isophthalic acid 5-sulfonate residues are derived from magnesium isophthalic acid 5-sulfonate.

\* \* \* \* \*

UNITED STATES PATENT AND TRADEMARK OFFICE
CERTIFICATE OF CORRECTION

PATENT NO. : 5,922,782
DATED : July 13, 1999
INVENTOR(S) : Kishan Chand Khemani

It is certified that error appears in the above-identified patent and that said Letters Patent is hereby corrected as shown below:

Column 8, line 21, "molt" should be ---mol %---

Signed and Sealed this

Seventh Day of December, 1999

Attest:

Q. TODD DICKINSON

*Attesting Officer*     *Acting Commissioner of Patents and Trademarks*